US011452106B2

(12) United States Patent
Xiang et al.

(10) Patent No.: US 11,452,106 B2
(45) Date of Patent: Sep. 20, 2022

(54) RESPONSE INFORMATION TRANSMISSION METHOD, COMMUNICATIONS DEVICE, AND NETWORK DEVICE

(71) Applicant: HUAWEI TECHNOLOGIES CO., LTD., Guangdong (CN)

(72) Inventors: Zhengzheng Xiang, Shanghai (CN); Hongjia Su, Shanghai (CN); Jinfang Zhang, Shenzhen (CN); Lei Lu, Shanghai (CN); Jun Luo, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 16/856,251

(22) Filed: Apr. 23, 2020

(65) Prior Publication Data

US 2020/0252940 A1    Aug. 6, 2020

Related U.S. Application Data

(63) Continuation of application No. PCT/CN2018/106414, filed on Sep. 19, 2018.

(30) Foreign Application Priority Data

Nov. 10, 2017  (CN) .......................... 201711103677.8

(51) Int. Cl.
*H04W 72/04*        (2009.01)
*H04L 1/16*         (2006.01)
(Continued)

(52) U.S. Cl.
CPC ....... *H04W 72/0493* (2013.01); *H04L 1/1614* (2013.01); *H04L 5/0055* (2013.01);
(Continued)

(58) Field of Classification Search
CPC ............. H04W 72/0493; H04W 72/02; H04W 72/0446; H04W 92/18; H04W 4/70;
(Continued)

(56) References Cited

U.S. PATENT DOCUMENTS

2014/0274183 A1   9/2014 Zhu et al.
2015/0223226 A1*  8/2015 Wu ....................... H04W 72/02
                                                    370/329
(Continued)

FOREIGN PATENT DOCUMENTS

CN     104380627 A    2/2015
CN     104486049 A    4/2015
(Continued)

OTHER PUBLICATIONS

3GPP TS 38.211 V1.0.0 (Sep. 2017), "3rd Generation Partnership Project; Technical Specification Group Radio Access Network; NR; Physical channels and modulation(Release 15)," Sep. 2017, 37 pages.
(Continued)

*Primary Examiner* — Ayaz R Sheikh
*Assistant Examiner* — Louis Samara
(74) *Attorney, Agent, or Firm* — Fish & Richardson P.C.

(57) ABSTRACT

Example response information sending and receiving methods and apparatus are described. One example sending method includes receiving first indication information by a first communications device from a network device, where the first indication information is used to indicate a first resource for transmitting first data. The first communications device sends the first data to a second communications device on the first resource. The first communications device receives second indication information from the network device, where the second indication information is used to indicate a second resource for transmitting response infor-
(Continued)

mation of the first data. The second source and the first resource do not include a same resource. The first communications device receives the response information of the first data from the second communications device on the second resource.

16 Claims, 9 Drawing Sheets

(51) Int. Cl.
*H04L 5/00* (2006.01)
*H04W 72/02* (2009.01)
*H04W 92/18* (2009.01)

(52) U.S. Cl.
CPC ....... *H04W 72/02* (2013.01); *H04W 72/0446* (2013.01); *H04W 92/18* (2013.01)

(58) Field of Classification Search
CPC . H04W 72/048; H04W 76/23; H04W 72/042; H04L 1/1614; H04L 5/0055; H04L 1/1812; H04L 27/2607; G08G 1/162
See application file for complete search history.

(56) References Cited

U.S. PATENT DOCUMENTS

| | | | |
|---|---|---|---|
| 2017/0118671 A1 | 4/2017 | Lee et al. | |
| 2017/0127405 A1* | 5/2017 | Agiwal | H04W 72/048 |
| 2017/0215183 A1* | 7/2017 | Gulati | H04W 72/0426 |
| 2020/0052966 A1* | 2/2020 | Yang | H04W 56/001 |
| 2020/0235897 A1* | 7/2020 | Tang | H04L 5/0032 |
| 2021/0258933 A1* | 8/2021 | Beale | H04L 5/0044 |
| 2021/0368348 A1* | 11/2021 | Belleschi | H04W 76/23 |
| 2021/0368487 A1* | 11/2021 | Nam | H04W 72/042 |

FOREIGN PATENT DOCUMENTS

| | | | | |
|---|---|---|---|---|
| CN | 105553612 A | 5/2016 | | |
| CN | 105991247 A | 10/2016 | | |
| CN | 106034013 A | 10/2016 | | |
| CN | 106612561 A | 5/2017 | | |
| EP | 3242515 A1 | 11/2017 | | |
| WO | WO-2015042789 A1 * | 4/2015 | ......... | H04L 27/2607 |
| WO | 2016035988 A1 | 3/2016 | | |

OTHER PUBLICATIONS

3GPP TS 38.331 V0.1.0 (Oct. 2017), "3rd Generation Partnership Project; Technical Specification Group Radio Access Network; NR; Radio Resource Control (RRC); Protocol specification(Release 15)," Oct. 2017, 42 pages.
3GPP TS 38.214 V1.0.0 (Sep. 2017), "3rd Generation Partnership Project; Technical Specification Group Radio Access Network; NR; Physical layer procedures for data (Release 15)," Sep. 2017, 32 pages.
3GPP TS 38.213 V1.0.0 (Sep. 2017), "3rd Generation Partnership Project; Technical Specification Group Radio Access Network; NR; Physical layer procedures for control(Release 15)," Sep. 2017, 16 pages.
Extended European Search Report issued in European Application No. 18876810.5 dated Oct. 23, 2020, 12 pages.
NEC, "Resource pool design for V2X," 3GPP TSG RAN WG1 Meeting #86, R1-166645, Gothenburg, Sweden Aug. 22-26, 2016, 3 pages.
ZTE, "Scheduling of V2V SPS resources," 3GPP TSG-RAN WG1 Meeting #86, R1-166981, Gothenburg, Sweden Aug. 22-26, 2016, 4 pages.
Office Action issued in Indian Application No. 202037017358 dated Apr. 26, 2021, 6 pages.
Office Action issued in Chinese Application No. 201711103677.8 dated Feb. 5, 2021, 8 pages.
PCT International Search Report and Written Opinion issued in International Application No. PCT/CN2018/106414 dated Nov. 26, 2018, 13 pages (with English translation).

* cited by examiner

RESPONSE INFORMATION TRANSMISSION METHOD, COMMUNICATIONS DEVICE, AND NETWORK DEVICE

CROSS-REFERENCE TO RELATED APPLICATIONS

This application is a continuation of International Application No. PCT/CN2018/106414, filed on Sep. 19, 2018, which claims priority to Chinese Patent Application No. 201711103677.8, filed on Nov. 10, 2017. The disclosures of the aforementioned applications are hereby incorporated by reference in their entireties.

TECHNICAL FIELD

Embodiments of this application relate to communications systems, and in particular, to a response information transmission method, a first communications device, a second communications device, and a network device.

BACKGROUND

Device-to-device (D2D) communication, vehicle-to-vehicle (V2V) communication, vehicle-to-pedestrian V2P (V2P) communication, or vehicle-to-infrastructure/network V2I/N (V2I/N) communication is a technology for direct communication between terminal devices. V2V, V2P, and V2I/N are collectively referred to as V2X, namely, communication between vehicles and anything.

Using the V2X communication as an example, the V2X communication includes a mode 3 and a mode 4. In the mode 3, a terminal device performs control information and data communication with another terminal device on a time-frequency resource allocated by an access network device. In the mode 4, a terminal device autonomously selects a time-frequency resource and performs control information and data communication with another terminal device on the selected time-frequency resource. In conventional V2X communication, after receiving data, a receive-end terminal device does not feed back, to notify the transmit-end terminal device whether the receive-end terminal device correctly receives the data, response information to a transmit-end terminal device that sends the data.

SUMMARY

Embodiments of this application provide a response information transmission method, a first communications device, a second communications device, and a network device, to transmit response information in V2X communication.

According to a first aspect, a response information sending method is provided. The method includes: receiving, by a first communications device, first indication information from a network device, where the first indication information is used to indicate a first resource for transmitting first data; sending, by the first communications device on the first resource, the first data to a second communications device; receiving, by the first communications device, second indication information from the network device, where the second indication information is used to indicate a second resource for transmitting response information of the first data, and the second resource and the first resource do not include a same resource; and receiving, by the first communications device on the second resource, the response information of the first data from the second communications device.

According to this embodiment of this application, the network device configures, for the first communications device and the second communications device, the second resource that can be used for the response information. The first communications device and the second communications device may transmit the response information on the second resource, and transmission of the response information is implemented in V2X communication.

In a possible design, the first resource includes x subframes, where x is a positive integer, and the sending, by the first communications device on the first resource, the first data to a second communications device includes: sending, by the first communications device in a subframe n, the first data to the second communications device, where the subframe n belongs to the x subframes; and the second resource includes y subframes, where y is a positive integer, and the receiving, by the first communications device on the second resource, the response information of the first data from the second communications device includes: receiving, by the first communications device in a subframe m, the response information of the first data from the second communications device, where the subframe m belongs to the y subframes, and the subframe m is a subframe, after a subframe n+k, with a minimum sequence number in the y subframes of the second resource, where the subframe n+k is a $k^{th}$ subframe after the subframe n, k is predefined or is received by the first communications device from the network device, and n, m, and k are all non-negative integers.

In a possible design, the subframe m includes a plurality of first time units, and the receiving, by the first communications device in a subframe m, the response information of the first data from the second communications device includes: receiving, by the first communications device on one of the plurality of first time units included in the subframe m, the response information of the first data from the second communications device. Therefore, resource utilization efficiency can be improved.

In a possible design, the receiving, by the first communications device in a subframe m, the response information of the first data from the second communications device includes: receiving, by the first communications device on some frequency domain resources in the subframe m, the response information of the first data from the second communications device. Therefore, resource utilization efficiency can be improved.

In a possible design, the first indication information includes a first bit map, and the second indication information includes a second bit map.

According to a second aspect, a first communications device is provided. The first communications device includes: a receiving unit, configured to receive first indication information from a network device, where the first indication information is used to indicate a first resource for transmitting first data; and a sending unit, configured to send, on the first resource, the first data to a second communications device, where the receiving unit is further configured to receive second indication information from the network device, where the second indication information is used to indicate a second resource for transmitting response information of the first data, and the second resource and the first resource do not include a same resource; and the receiving unit is further configured to receive, on the second resource, the response information of the first data from the second communications device.

According to this embodiment of this application, the network device configures, for the first communications device and the second communications device, the second resource that can be used for the response information. The first communications device and the second communications device may transmit the response information on the second resource, and transmission of the response information is implemented in V2X communication.

In a possible design, the first resource includes x subframes, where x is a positive integer, and that the sending unit sends, on the first resource, the first data to the second communications device includes: sending, by the sending unit in a subframe n, the first data to the second communications device, where the subframe n belongs to the x subframes; and the second resource includes y subframes, where y is a positive integer, and that the receiving unit receives, on the second resource, the response information of the first data from the second communications device includes: receiving, by the receiving unit in a subframe m, the response information of the first data from the second communications device, where the subframe m belongs to the y subframes, and the subframe m is a subframe, after a subframe n+k, with a minimum sequence number in the y subframes of the second resource, where the subframe n+k is a $k^{th}$ subframe after the subframe n, k is predefined or is received by the receiving unit from the network device, and n, m, and k are all non-negative integers.

In a possible design, the subframe m includes a plurality of first time units, and that the receiving unit receives, in the subframe m, the response information of the first data from the second communications device includes: receiving, by the receiving unit on one of the plurality of first time units included in the subframe m, the response information of the first data from the second communications device. Therefore, resource utilization efficiency can be improved.

In a possible design, that the receiving unit receives, in the subframe m, the response information of the first data from the second communications device includes: receiving, by the receiving unit on some frequency domain resources in the subframe in, the response information of the first data from the second communications device. Therefore, resource utilization efficiency can be improved.

In a possible design, the first indication information includes a first bit map, and the second indication information includes a second bit map.

According to a third aspect, a response information sending method is provided. The method includes: receiving, by a second communications device, first indication information from a network device, where the first indication information is used to indicate a first resource for transmitting first data; receiving, by the second communications device on the first resource, the first data from a first communications device; receiving, by the second communications device, second indication information from the network device, where the second indication information is used to indicate a second resource for transmitting response information of the first data, and the second resource and the first resource do not include a same resource; and sending, by the second communications device on the second resource, the response information of the first data to the first communications device.

According to this embodiment of this application, the network device configures, for the first communications device and the second communications device, the second resource that can be used for the response information. The first communications device and the second communications device may transmit the response information on the second resource, and transmission of the response information is implemented in V2X communication.

In a possible design, the first resource includes x subframes, where x is a positive integer, and the receiving, by the second communications device on the first resource, the first data from a first communications device includes: receiving, by the second communications device in a subframe n, the first data from the first communications device, where the subframe n belongs to the x subframes; and the second resource includes y subframes, where y is a positive integer, and the sending, by the second communications device on the second resource, the response information of the first data to the first communications device includes: sending, by the second communications device in a subframe m, the response information of the first data to the first communications device, where the subframe m belongs to the y subframes, and the subframe m is a subframe, after a subframe n+k, with a minimum sequence number in the y subframes of the second resource, where the subframe n+k is a $k^{th}$ subframe after the subframe n, k is predefined, is received by the second communications device from the first communications device, or is received by the second communications device from the network device, and n, m, and k are all non-negative integers.

In a possible design, the subframe m includes a plurality of first time units, and the sending, by the second communications device in a subframe m, the response information of the first data to the first communications device includes: sending, by the second communications device on one of the plurality of first time units included in the subframe m, the response information of the first data to the first communications device. Therefore, resource utilization efficiency can be improved.

In a possible design, the sending, by the second communications device in a subframe m, the response information of the first data to the first communications device includes: sending, by the second communications device on some frequency domain resources in the subframe m, the response information of the first data to the first communications device. Therefore, resource utilization efficiency can be improved.

In a possible design, the first indication information includes a first bit map, and the second indication information includes a second bit map.

According to a fourth aspect, a second communications device is provided. The second communications device includes: a receiving unit, configured to receive first indication information from a network device, where the first indication information is used to indicate a first resource for transmitting first data; the receiving unit is further configured to receive, on the first resource, the first data from a first communications device; and the receiving unit is further configured to receive second indication information from the network device, where the second indication information is used to indicate a second resource for transmitting response information of the first data, and the second resource and the first resource do not include a same resource; and a sending unit, configured to send, on the second resource, the response information of the first data to the first communications device.

According to this embodiment of this application, the network device configures, for the first communications device and the second communications device, the second resource that can be used for the response information. The first communications device and the second communications device may transmit the response information on the second resource, and transmission of the response information is implemented in V2X communication.

In a possible design, the first resource includes x subframes, where x is a positive integer, and that the receiving unit receives, on the first resource, the first data from the first communications device includes: receiving, by the receiving unit in a subframe n, the first data from the first communications device, where the subframe n belongs to the x subframes; and the second resource includes y subframes, where y is a positive integer, and that the sending unit sends, on the second resource, the response information of the first data to the first communications device includes: sending, by the sending unit in a subframe m, the response information of the first data to the first communications device, where the subframe m belongs to the y subframes, and the subframe m is a subframe, after a subframe n+k, with a minimum sequence number in the y subframes of the second resource, where the subframe n+k is a $k^{th}$ subframe after the subframe n, k is predefined, is received by the receiving unit from the first communications device, or is received by the receiving unit from the network device, and n, m, and k are all non-negative integers.

In a possible design, the subframe m includes a plurality of first time units, and that the sending unit sends, in the subframe m, the response information of the first data to the first communications device includes: sending, by the sending unit on one of the plurality of first time units included in the subframe m, the response information of the first data to the first communications device. Therefore, resource utilization efficiency can be improved.

In a possible design, that the sending unit sends, in the subframe m, the response information of the first data to the first communications device includes: sending, by the sending unit on some frequency domain resources in the subframe m, the response information of the first data to the first communications device. Therefore, resource utilization efficiency can be improved.

In a possible design, the first indication information includes a first bit map, and the second indication information includes a second bit map.

According to a fifth aspect, a response information transmission resource indication method is provided. The method includes: sending, by a network device, first indication information to at least one communications device, where the first indication information is used to indicate a first resource for transmitting first data between a first communications device and a second communications device, and the first communications device and the second communications device belong to the at least one communications device; and sending, by the network device, second indication information to the at least one communications device, where the second indication information is used to indicate a second resource for transmitting response information of the first data between the first communications device and the second communications device, and the second resource and the first resource do not include a same subframe.

According to this embodiment of this application, the network device configures, for the first communications device and the second communications device, the second resource that can be used for the response information. The first communications device and the second communications device may transmit the response information on the second resource, and transmission of the response information is implemented in V2X communication.

In a possible design, the first indication information includes a first bit map, and the second indication information includes a second bit map.

According to a sixth aspect, a network device is provided. The network device includes: a sending unit, configured to send first indication information to at least one communications device, where the first indication information is used to indicate a first resource for transmitting first data between a first communications device and a second communications device, and the first communications device and the second communications device belong to the at least one communications device; and the sending unit is further configured to send second indication information to the at least one communications device, where the second indication information is used to indicate a second resource for transmitting response information of the first data between the first communications device and the second communications device, and the second resource and the first resource do not include a same subframe.

According to this embodiment of this application, the network device configures, for the first communications device and the second communications device, the second resource that can be used for the response information. The first communications device and the second communications device may transmit the response information on the second resource, and transmission of the response information is implemented in V2X communication.

In a possible design, the first indication information includes a first bit map, and the second indication information includes a second bit map.

According to a seventh aspect, an embodiment of this application provides a computer storage medium. The computer storage medium is configured to store a computer software instruction used by the foregoing network device, and the computer software instruction includes a program designed for performing the foregoing aspects.

According to an eighth aspect, an embodiment of this application provides a computer storage medium. The computer storage medium is configured to store a computer software instruction used by the first communications device or the second communications device, and the computer software instruction includes a program designed for performing the foregoing aspects.

According to a ninth aspect, an embodiment of this application provides a computer program product. The program product stores a computer software instruction used by the foregoing access network device, the first communications device, or the second communications device, and the computer software instruction includes a program used to perform the solutions in the foregoing aspects.

According to a tenth aspect, an embodiment of this application provides a chip, configured to perform the methods in the foregoing aspects. The chip may include a part having functions of a memory, a processor, a transmitter, a receiver, and/or a transceiver, and the memory stores an instruction, code, and/or data, to perform the methods in the foregoing aspects.

According to an eleventh aspect, an embodiment of this application provides a system. The system includes the network device, the first communications device, and/or the second communications device in the foregoing aspects.

DESCRIPTION OF EMBODIMENTS

Figure 1:
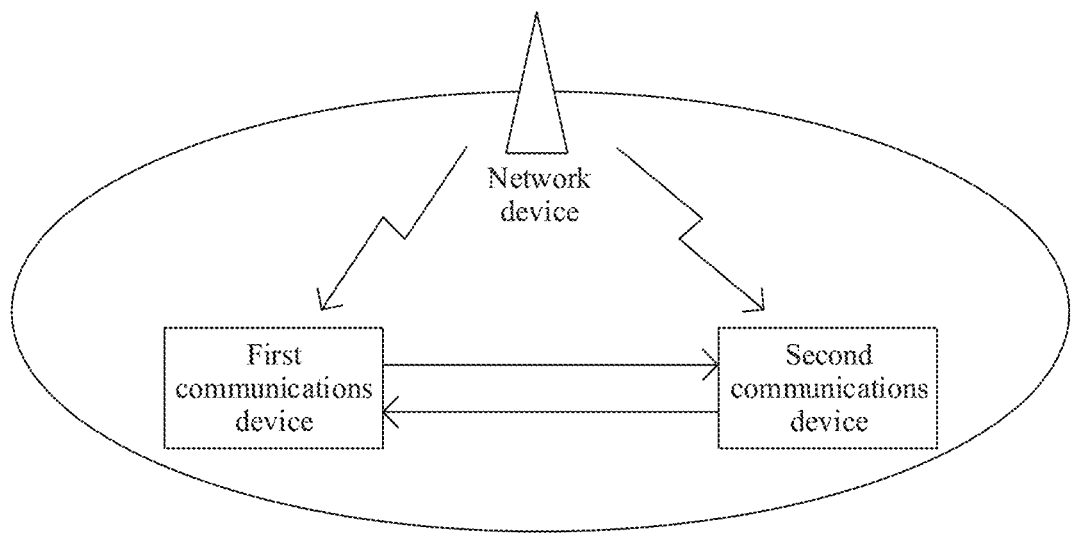
FIG. 1 is a schematic architectural diagram of a system according to an embodiment of this application.

In FIG. 1, a network device sends indication information to a first communications device and a second communications device. The indication information indicates a resource configured by the network device for transmitting response information between the first communications device and the second communications device. The first communications device may determine, through scheduling by a base station or autonomous selection, a resource used to send data, and send, on the resource, the data to the second communications device. The second communications device may correctly receive the data, or cannot correctly receive the data. Then, the second communications device sends, on the resource for transmitting the response information that is indicated by the indication information, the response information to the first communications device, and the response information is used to feed back a transmission status of the data. The response information may be acknowledgement (ACK) information or negative acknowledgement (NACK) information.

The network device in this application is an apparatus that is deployed in a radio access network and that is configured to provide a wireless communication function for a communications device. The network device may include various forms of base stations (BS), such as a macro base station, a micro base station, a relay node, or an access point. In systems using different radio access technologies, a device having a network device function may have different names. For example, in a 5th generation 5G network, the device is a network device; in an LTE network, the device is referred to as an evolved NodeB (eNB or eNodeB for short); and in a 3rd generation 3G network, the device is referred to as a NodeB. The device is alternatively a road side unit (RSU) in V2V communication, or the network device may be a chip or a system on chip (SOC). For ease of description, in this application, the foregoing apparatus that provides the wireless communication function for the communications device is collectively referred to as the network device.

The communications device in this application may include various handheld devices having the wireless communication function, for example, a vehicle-mounted device, a wearable device, a computing device, or another processing device connected to a wireless modem, a mobile station (MS), a terminal, user equipment (UE), a chip, or an SOC. For ease of description, in this application, the devices mentioned above are collectively referred to as the communications device.

The following describes the embodiments of this application in more detail with reference to specific examples by using a network device, a first communications device, and a second communications device as an example.

Figure 2:
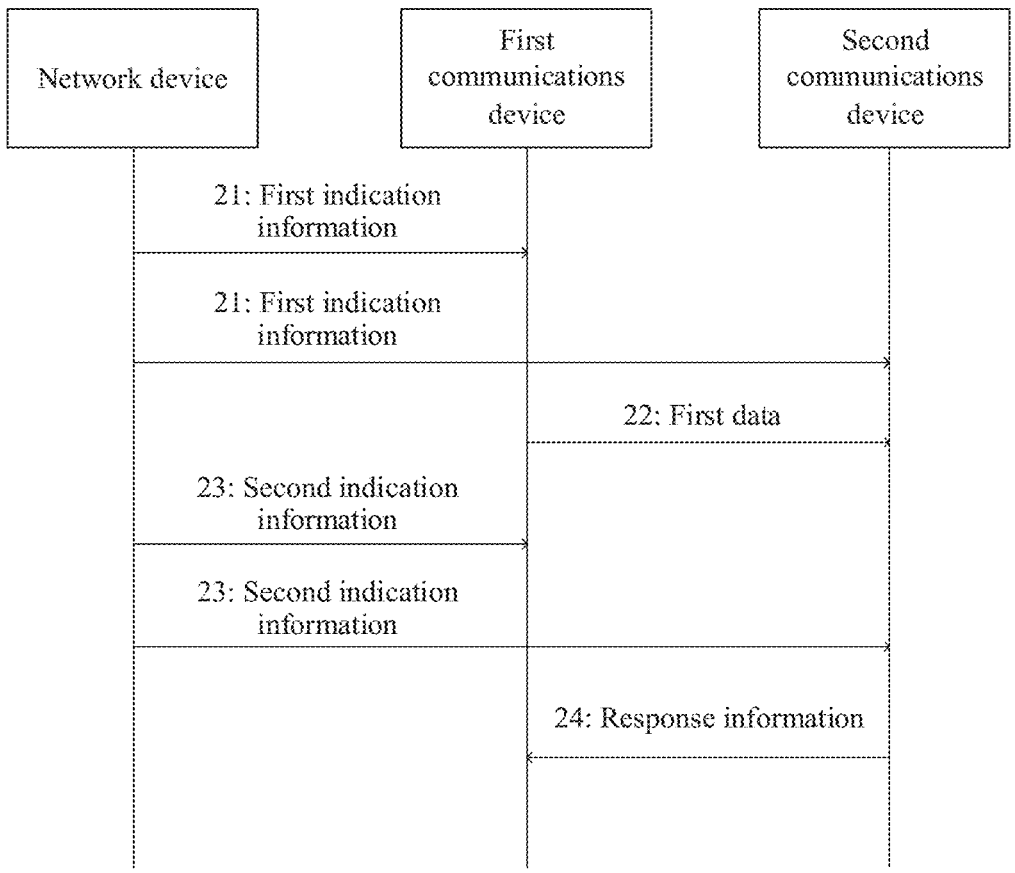
FIG. 2 shows a response information transmission method, a first communications device, a second communications device, and a network device according to an embodiment of this application.
Figure 9:
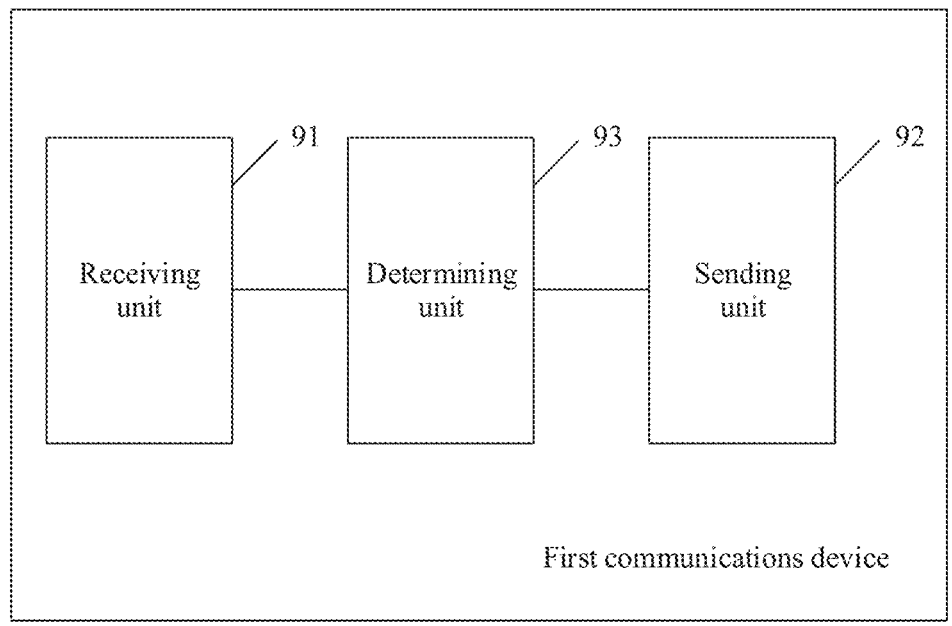
FIG. 9 shows a first communications device according to an embodiment of this application.
Figure 10:
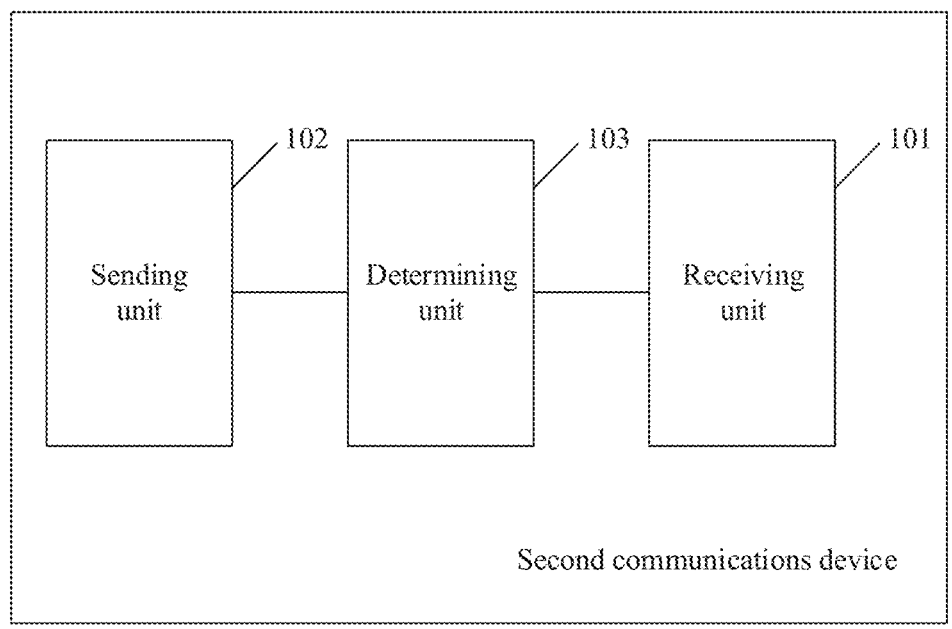
FIG. 10 shows a second communications device according to an embodiment of this application.
Figure 11:
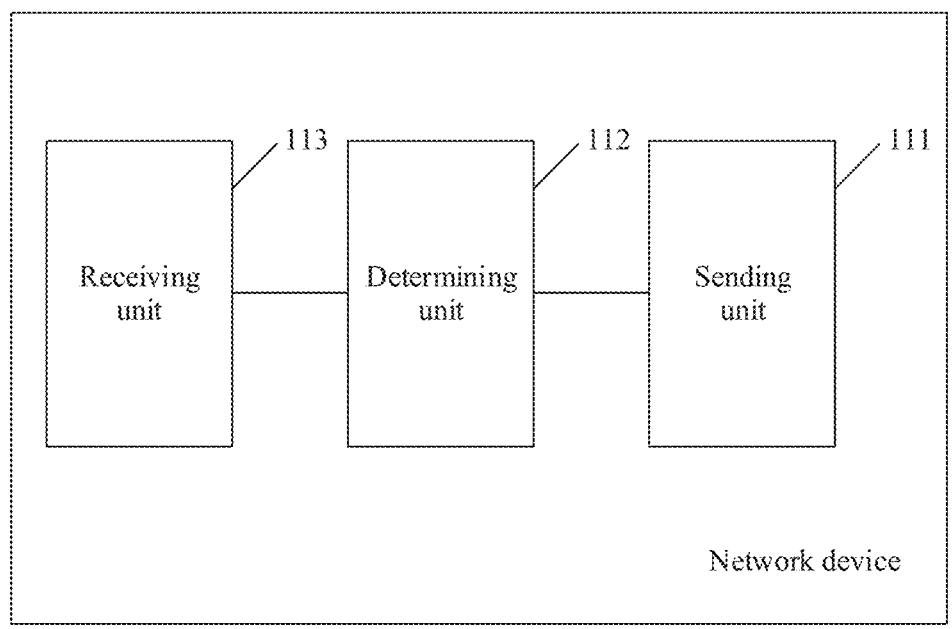
FIG. 11 shows a network device according to an embodiment of this application.

FIG. 2 shows a response information transmission method, a first communications device, a second communications device, a network device, and a system according to an embodiment of this application. As shown in FIG. 9, the first communications device includes a receiving unit 91 and a sending unit 92. The first communications device may further include a determining unit 93, and the receiving unit 91 and the sending unit 92 communicate with the determining unit 93. As shown in FIG. 10, the second communications device includes a receiving unit 101 and a sending unit 102. The second communications device may further include a determining unit 103, and the receiving unit 101 and the sending unit 102 communicate with the determining unit 103. As shown in FIG. 11, the network device includes a sending unit 111. The network device may further include a determining unit 112 and a receiving unit 113, and the receiving unit 113 and the sending unit 111 communicate with the determining unit 112.

Step 21: The sending unit 111 of the network device sends first indication information to at least one communications device. Specifically, as shown in FIG. 2, the network device sends first indication information to the first communications device and the second communications device. The receiving unit 91 of the first communications device receives the first indication information from the network device, and the receiving unit 101 of the second communications device also receives the first indication information from the network device, where the first indication information is used to indicate a first resource for transmitting first data. The network device notifies, by using the first indication information, the first communications device and the second communications device of the resource allocated by the network device for V2X communication between the first communications device and the second communications device, so that the first communications device and the second communications device can perform data transmission on the resource allocated by the network device.

Figure 3:
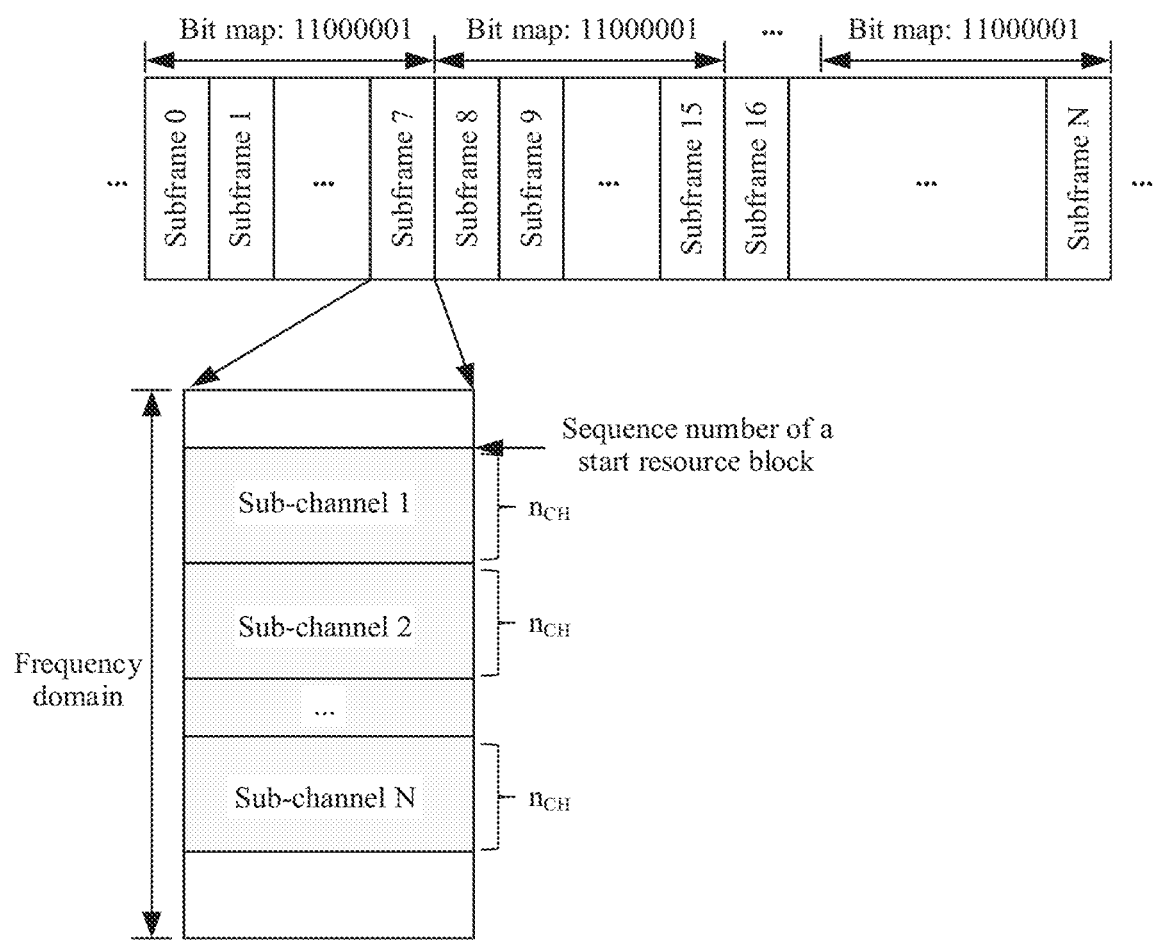
FIG. 3 is a schematic diagram of subframes for response information transmission according to an embodiment of this application.

In FIG. 2, a sequence in which the network device sends the first indication information to the first communications device and sends the first indication information to the second communications device is not limited. Preferably, the network device sends, in a broadcast manner, the first indication information to the first communications device and the second communications device, where the first indication information may be bit map information, and the first indication information may be sent by using radio resource control (RRC) signaling. Specifically, as shown in FIG. 3, the first indication information is used by the network device to indicate, to a plurality of communications devices, time domain information of the resource allocated by the network device for the V2X communication. A length of a bit map shown in FIG. 3 is 8 bits, and the bit map is specifically 11000001. The bit map is used to periodically indicate time domain resources used for V2X communication. For example, the bit map is used to indicate that a subframe 0, a subframe 1, and a subframe 7 can be used as resources that can be used for V2X communication in the first period, and in the second period, the bit map indicates that a subframe 8, a subframe 9, and a subframe 15 may be used as resources that can be used for V2X communication in the second period. In other words, the first resource indicated by the first indication information includes subframes that can be used for V2X communication.

In FIG. 3, for a subframe used for V2X communication, the network device divides a frequency domain resource into several sub-channels, and each sub-channel includes several resource blocks (RB). The network device indicates, to the communications device by using the indication information, a sequence number of the first resource block of a resource used for V2X communication. A quantity of resource blocks included in each sub-channel is $n_{CH}$, and a quantity of sub-channels that can be used for V2X communication is N, where $n_{CH}$ and N are positive integers. Preferably, the network device may notify, by using the first indication information, the first communications device and the second communications device of the sequence number of the first resource block of the resource used for the V2X communication resource, $n_{CH}$, and N. Certainly, the network device may alternatively send the foregoing information to the first communications device and the second communications device by using other indication information.

Step 22: The sending unit 92 of the first communications device sends, on the first resource indicated by the first indication information, the first data to the second communications device, and the receiving unit 101 of the second communications device receives, on the first resource, the first data from the first communications device. The first data may be status information periodically sent by a vehicle to another vehicle, such as location information, speed information, or other status information. The second communications device may learn of status information of the first communications device, and adjust a traveling direction, a speed, and the like of the second communications device based on the status information of the first communications device, and therefore, travelling safety of the second communications device is improved. Preferably, the first communications device sends, in a broadcast manner, the first data to the second communications device and another communications device around the first communications device.

Although the first communications device sends the first data to the second communications device, the second communications device may correctly receive the first data, or may not correctly receive the first data.

Step 23: The sending unit 111 of the network device sends second indication information to the at least one communications device. Specifically, as shown in FIG. 2, the network device sends second indication information to the first communications device and the second communications device. The receiving unit 91 of the first communications device receives the second indication information from the network device, the receiving unit 101 of the second communications device also receives the second indication information from the network device, where the second indication information is used to indicate a second resource for transmitting response information of the first data, and the second resource and the first resource do not include a same resource.

Figure 4:
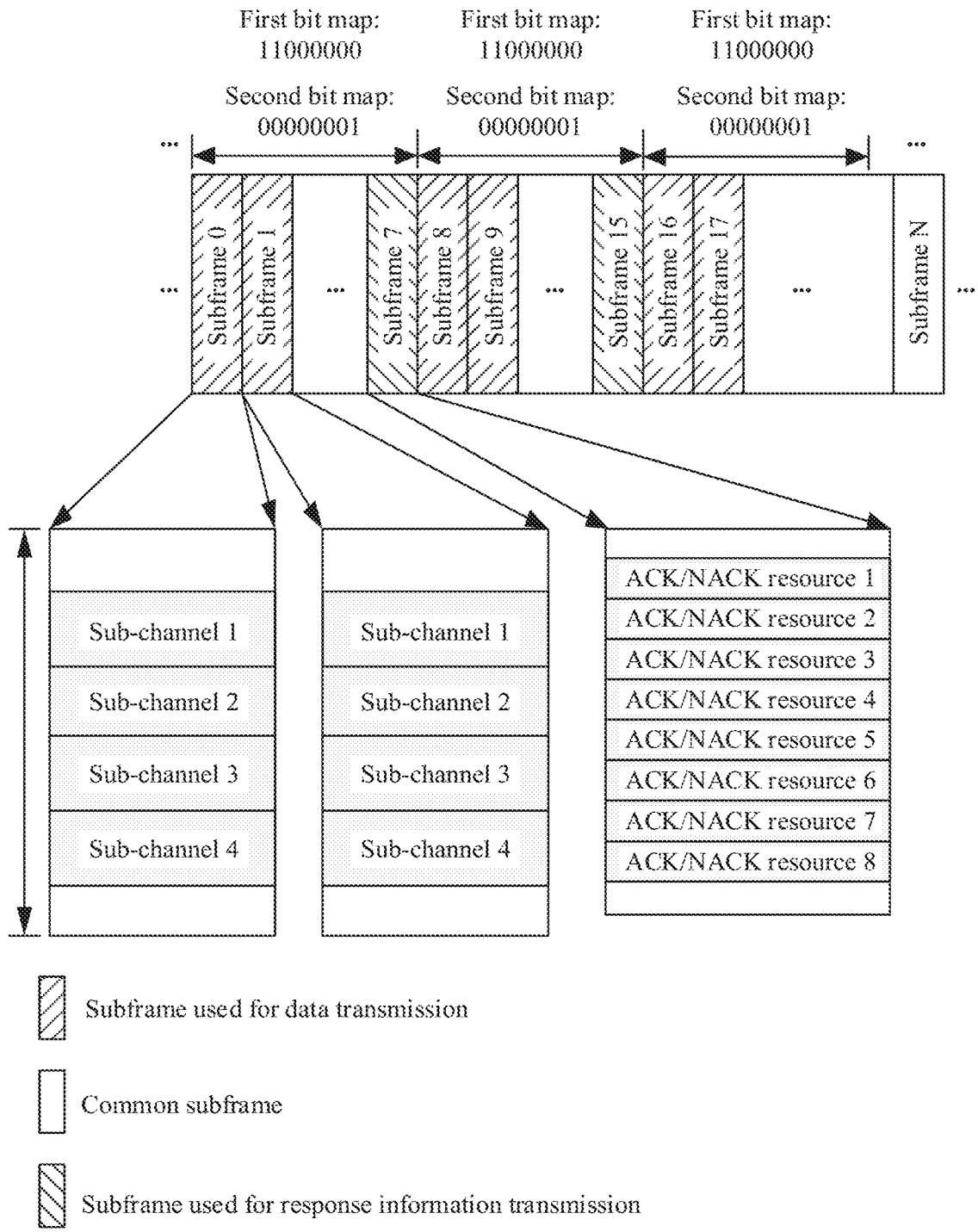
FIG. 4 is a schematic diagram of subframes for response information transmission according to an embodiment of this application.

The second indication information may include bit map information. A bit map is used to periodically indicate a resource used for response information transmission. As shown in FIG. 4, a first bit map is 11000000, and indicates that subframes used for V2X data transmission are a subframe 0, a subframe 1, a subframe 8, a subframe 9, a subframe 16, a subframe 17, and the like, and that a subframe 2 to a subframe 6 and a subframe 10 to a subframe 14 are common subframes. A second bit map is 00000001, and indicates that subframes used for transmitting the response information of the data are a subframe 7, a subframe 15, a subframe 23, and the like. Resources used for response information transmission and resources used for V2X data transmission do not include a same resource, in other words, the resources used for response information transmission and the resources used for V2X data transmission are different resources. Preferably, response information of V2X data is transmitted in the first subframe that appears after a resource used for transmitting the V2X data. For example, as shown in FIG. 4, response information of V2X data transmitted in the subframe 0 and the subframe 1 is fed back in the subframe 7. Response information of V2X data transmitted in the subframe 8 and the subframe 9 is fed back in the subframe 15. The response information includes ACK information or NACK information, and the response information does not include additional information. For example, the response information does not include communications device identification information corresponding to the response information, or does not include data packet identification information corresponding to the response information. Therefore, a specific rule needs to be preset in a communications protocol, so that the communications device learns of a specific data packet of a specific communications device to which the response information belongs. For example, the preset rule may be in ascending order of subframe numbers and in ascending order of sub-channel numbers. Sub-channels in a subframe with a smaller subframe number are first mapped to the response information transmission resource, and then sub-channels in a subframe with a larger subframe number are mapped to the response information transmission resource. For example, in FIG. 4, the subframe 0 includes four sub-channels: a sub-channel 1 to a sub-channel 4, and the subframe 1 also includes four sub-channels: a sub-channel 1 to a sub-channel 4. In this case, an ACK/NACK resource 1 is used to feed back response information of the sub-channel 1 in the subframe 0, an ACK/NACK resource 2 is used to feed back response information of the sub-channel 2 in the subframe 0, an ACK/NACK resource 3 is used to feed back response information of the sub-channel 3 in the subframe 0, an ACK/NACK resource 4 is used to feed back response information of the sub-channel 4 in the subframe 0, an ACK/NACK resource 5 is used to feed back response information of the sub-channel 1 of the sub-frame 1, an ACK/NACK resource 6 is used to feed back response information of the sub-channel 2 of the sub-frame 1, an ACK/NACK resource 7 is used to feed back response information of the sub-channel 3 of the sub-frame 1, and an ACK/NACK resource 8 is used to feed back response information of the sub-channel 4 in the subframe 1. Preferably, a location of the resource used to transmit the ACK/NACK may be a function of an index of a slot in which data corresponding to the ACK/NACK is located and a lowest sub-channel index.

The first resource includes x subframes, where x is a positive integer, and the sending, by the first communications device on the first resource, the first data to the second communications device includes: sending, by the first communications device in a subframe n, the first data to the second communications device, where the subframe n belongs to the x subframes. The second resource includes y subframes, where y is a positive integer, and the receiving, by the first communications device on the second resource, the response information of the first data from the second communications device includes: receiving, by the first communications device in a subframe m, the response information of the first data from the second communications device, where the subframe m belongs to the y subframes, and the subframe m is a subframe, after a subframe n+k, with a smallest sequence number in the y subframes of the second resource, where the subframe n+k is a $k^{th}$ subframe after the subframe n, and n, m, and k are all non-negative integers. If the subframe n+k is a subframe that belongs to the second resource, a resource used to feed back response information of data transmitted in the subframe n may be the subframe n+k, or may be a subframe n+k+1.

Figure 5:
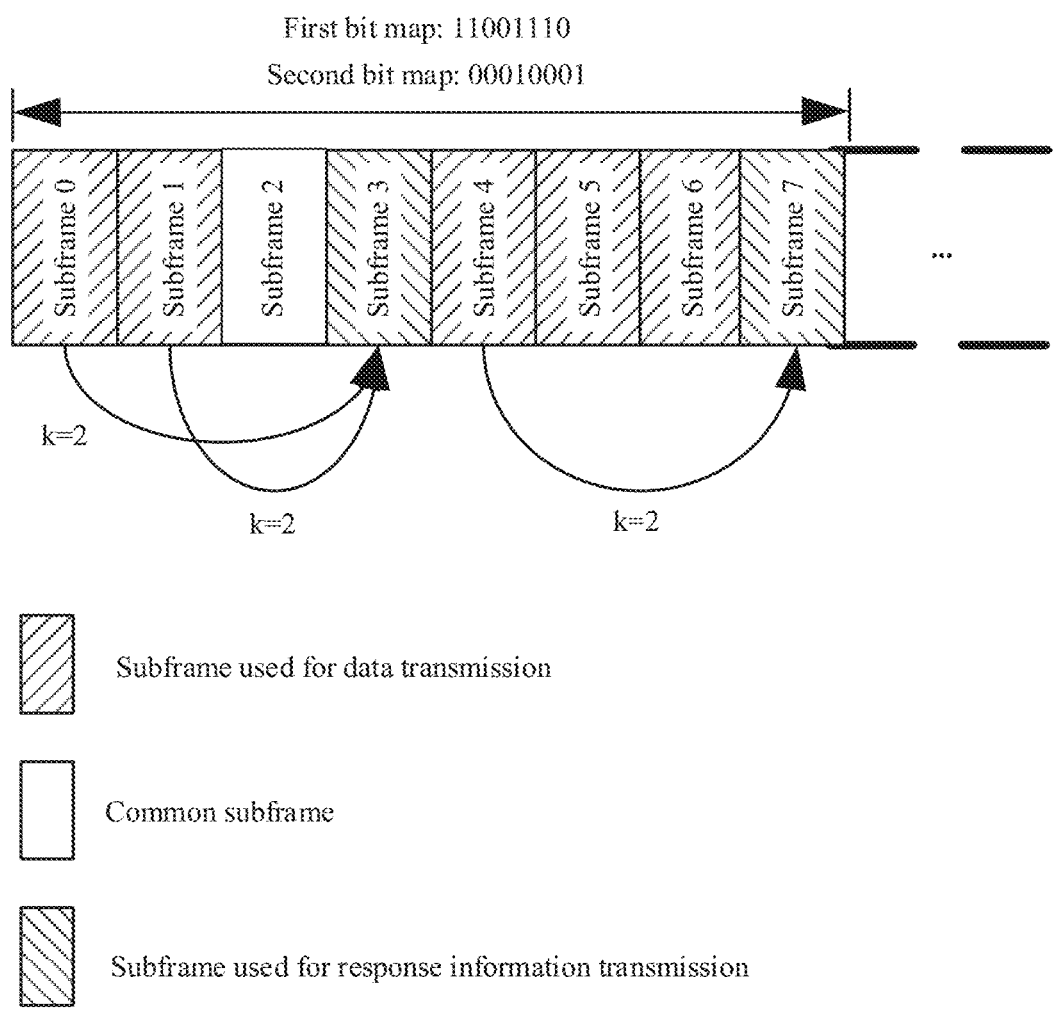
FIG. 5 is a schematic time sequence diagram of response information transmission according to an embodiment of this application.

A value of k may be predefined in a protocol. For example, as shown in FIG. 5, a first resource includes a subframe 0, a subframe 1, a subframe 4, a subframe 5, a subframe 6, and the like, a second resource includes a subframe 3, a subframe 7, and the like, and that a value of k is 2 is preset in the protocol. For the subframe 0, a value of n is 0, so that a value of n+k is 2. In this case, a subframe, after a subframe 2, with a smallest sequence number in the second resource is the subframe 3, so that response information of data transmitted in the subframe 0 is fed back in the subframe 3. Similarly, response information of data transmitted in the subframe 1 is fed back in the subframe 3, response information of data transmitted in the subframe 4 is fed back in the subframe 7, and the rest may be deduced by analogy.

Figure 6:
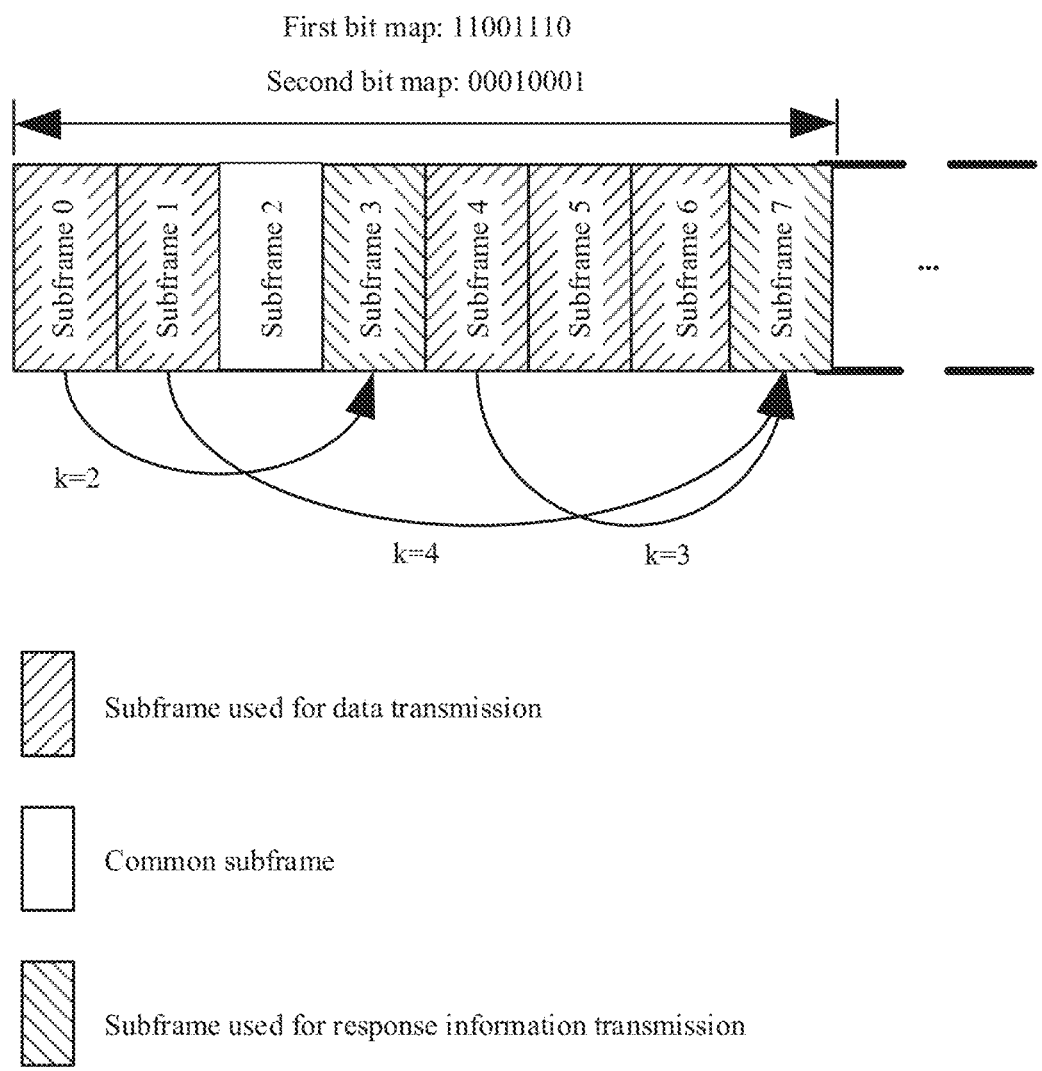
FIG. 6 is a schematic time sequence diagram of response information transmission according to an embodiment of this application.

A value of k may alternatively be semi-statically configured or dynamically configured. For example, the value of k may be sent by the network device to the first communications device or the second communications device, or the value of k may be sent by the network device to the first communications device and then sent by the first communications device to the second communications device. The value of k may be independently configured for different subframes, may be configured for a subframe in a period, or may be configured to be the same for all subframes. As shown in FIG. 6, a first resource includes a subframe 0, a subframe 1, a subframe 4, a subframe 5, a subframe 6, and the like, a second resource includes a subframe 3, a subframe 7, and the like. Therefore, for the subframe 0, a value of n is 0, so that a value of n+k is 2. Therefore, a subframe, after a subframe 2, with a smallest sequence number in the second resource is the subframe 3, so that response information of data transmitted in the subframe 0 is fed back in the subframe 3. For the subframe 1, a value of n is 1, a value of k is 4, so that a value of n+k is 5. Therefore, a subframe, after the subframe 5, with a smallest sequence number in the second resource is the subframe 7, so that response information of data transmitted in the subframe 1 is fed back in the subframe 7. For the subframe 4, a value of n is 4, a value of k is 3, so that a value of n+k is 7. Therefore, a subframe, after the subframe 7, with a smallest sequence number in the second resource is the subframe 7, so that response information of data transmitted in the subframe 4 is fed back in the subframe 7. The rest may be deduced by analogy.

Figure 7:
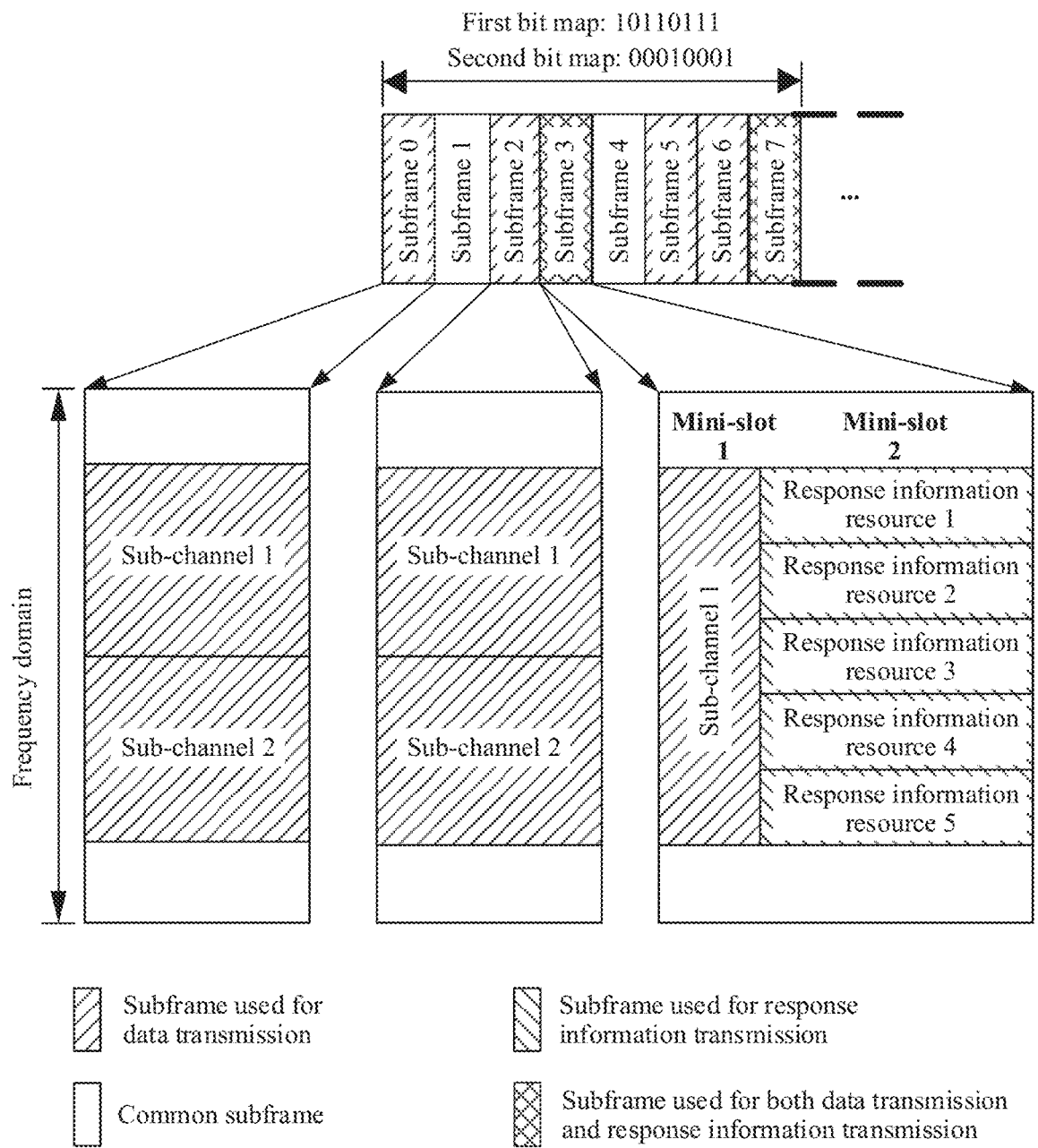
FIG. 7 is a schematic diagram of subframes for response information transmission according to an embodiment of this application.

Optionally, the subframe m includes a plurality of first time units, and the receiving, by the first communications device in the subframe m in the response information of the first data from the second communications device includes: receiving, by the first communications device on one of the plurality of first time units included in the subframe m, the response information of the first data from the second communications device. Preferably, the first time unit may be a slot, a mini-slot, or a symbol. Specifically, a specific first time unit or several specific first time units that are in the plurality of first time units included in the subframe m and that are used for response information transmission may be predefined by a protocol, or may be semi-statically or dynamically configured by the network device. For example, as shown in FIG. 7, a first bit map is 10110111, and therefore, a subframe 0, a subframe 2, a subframe 3, a subframe 5, a subframe 6, a subframe 7, and the like are a first resource used for V2X data transmission. A second bit map is 00010001, and therefore, a subframe 3, a subframe 7, and the like are a second resource used for response information transmission. It can be learned that the subframe 3, the subframe 7, and the like are used for both V2X data transmission and response information transmission. A mini-slot 1 in the subframe 3 is used for data transmission, and a mini-slot 2 in the subframe 3 is used for response information transmission. If response information of data transmitted in the subframe 0, the subframe 2, and the mini-slot 1 in the subframe 3 is fed back in the mini-slot 2 in the subframe 3, and when the subframe 0 and the subframe 1 each include two sub-channels and the mini-slot 1 in the subframe 3 includes only one sub-channel, a response information resource 1 is used to feed back response information of data transmitted on a sub-channel 1 in the subframe 0, a response information resource 2 is used to feed back response information of data transmitted on a sub-channel 2 in the subframe 0, a response information resource 3 is used to feed back response information of data transmitted on a sub-channel 1 in the subframe 2, a response information resource 4 is used to feed back response information of data transmitted on a sub-channel 2 in the subframe 2, and a response information resource 5 is used to feed back response information of data transmitted on a sub-channel 1 in the mini-slot 1 in the subframe 3. Therefore, resource utilization efficiency can be improved.

Figure 8:
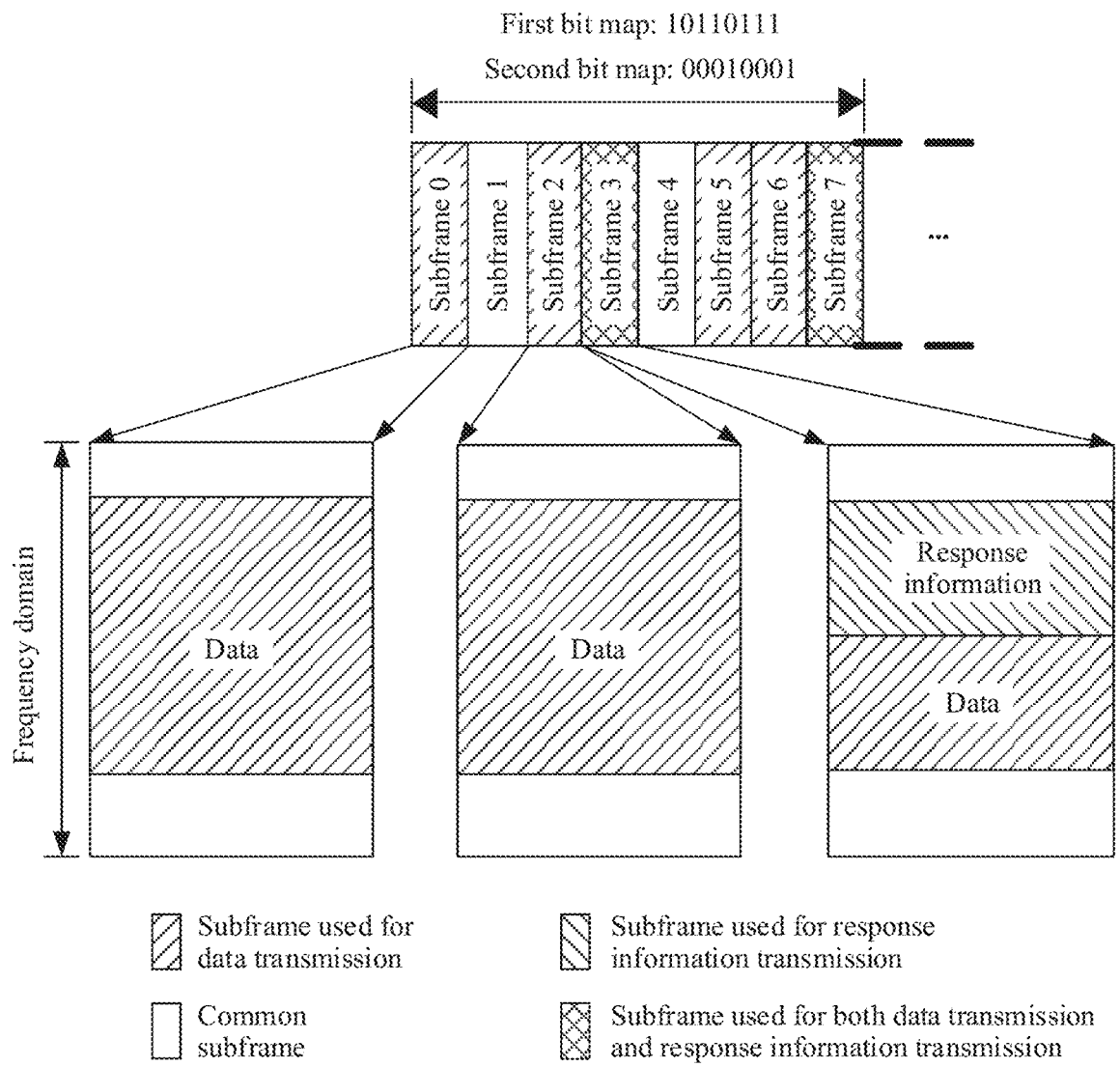
FIG. 8 is a schematic diagram of subframes for response information transmission according to an embodiment of this application.

Optionally, the receiving, by the first communications device in the subframe m, the response information of the first data from the second communications device includes: receiving, by the first communications device on some frequency domain resources in the subframe m, the response information of the first data from the second communications device. Specifically, a specific frequency domain resource or several specific frequency domain resources that are in the plurality of frequency domain resources included in the subframe m and that are used for response information transmission may be predefined by a protocol, or may be semi-statically or dynamically configured by the network device. For example, as shown in FIG. 8, a first bit map is 10110111, and therefore, a subframe 0, a subframe 2, a subframe 3, a subframe 5, a subframe 6, a subframe 7, and the like are a first resource used for V2X data transmission. A second bit map is 00010001, and therefore, a subframe 3, a subframe 7, and the like are a second resource used for response information transmission. It can be learned that the subframe 3, the subframe 7, and the like are used for both V2X data transmission and response information transmission. In FIG. 8, in the subframe 3, only some frequency domain resources are used for response information transmission. In the subframe 3 or the subframe 7, a frequency domain resource may be divided into several frequency domain units. For example, a frequency domain unit may be a subcarrier or a sub-channel. In this case, one or more frequency domain units of the frequency domain resource are used for response information transmission, and a remaining frequency domain unit may be used for data transmission. Therefore, resource utilization efficiency can be improved.

Preferably, the first communications device may dynamically notify, by using control signaling, the second communications device whether a response information feedback needs to be performed on the data sent by the first communications device to the second communications device. If the response information needs to be fed back, the method in step 23 is used, and the second communications device feeds back the response information to the first communications device. If the response information does not need to be fed back, a resource used to feed back the response information of the data is released, to be used for other V2X data communication.

Step 24: The receiving unit 91 of the first communications device receives, on the second resource, the response information of the first data from the second communications device, and the sending unit 102 of the second communications device sends, on the second resource, the response information of the first data to the second communications device. The response information includes ACK information or NACK information. When the first communications device receives the ACK information from the second communications device, the first communications device no longer sends the first data to the second communications device, and therefore, communication resources are saved. When the first communications device receives the NACK information from the second communications device, the first communications device sends the first data to the second communications device again, and therefore, reliability of receiving the first data by the second communications device is improved, and reliable transmission of V2X data between different communications devices is ensured.

The receiving unit 91 included in the first communications device may be replaced by a receiver, the determining unit 93 may be replaced by a processor, and the sending unit 92 may be replaced by a transmitter. The sending unit 102 included in the second communications device may be replaced by a transmitter, the determining unit 103 may be replaced by a processor, and the receiving unit 101 may be replaced by a receiver. The sending unit 111 included in the network device may be replaced by a transmitter, the determining unit 112 may be replaced by a processor, and the receiving unit 113 may be replaced by a receiver. Alternatively, the first communications device, the second communications device, or the network device may be a chip or a system on chip, to complete the method shown in the embodiment of FIG. 2.

According to this embodiment of this application, the network device configures, for the first communications device and the second communications device, the second resource that can be used for the response information. The first communications device and the second communications device may transmit the response information on the second resource, and transmission of the response information is implemented in V2X communication.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A feedback information sending method, comprising:
receiving, by a first communications device, first indication information from a network device, wherein the first indication information indicates a first resource for sidelink communication, the first resource comprises x subframes, x is a positive integer larger than 1;
sending, by the first communications device in a subframe n, first data to a second communications device, wherein the subframe n belongs to the x subframes;
receiving, by the first communications device, second indication information from the network device, wherein the second indication information is used to determine a second resource for transmitting feedback information, wherein the second resource comprises y subframes, y is a positive integer, and the y subframes belong to the x subframes; and
receiving, by the first communications device in a subframe m, feedback information of the first data from the second communications device, wherein the subframe m belongs to the y subframes, the subframe m is a subframe that is after a subframe n+k and with a minimum sequence number in the y subframes, wherein the subframe n+k is a $k^{th}$ subframe after the subframe n, wherein k is predefined or is received by the first communications device from the network device, and wherein n, m, and k are all non-negative integers.

2. The method according to claim 1, wherein:
the subframe m comprises a plurality of first time units, and wherein the receiving, by the first communications device in the subframe m, the feedback information of the first data from the second communications device comprises:
receiving, by the first communications device and on one of the plurality of first time units comprised in the subframe m, the feedback information of the first data from the second communications device.

3. The method according to claim 1, wherein the first indication information comprises a first bit map, and wherein the second indication information comprises a second bit map.

4. A first communications device, comprising:
at least one processor; and
a memory storing instructions executable by the at least one processor, wherein the instructions, when executed by the at least one processor, instruct the at least one processor to:
receive first indication information from a network device, wherein the first indication information indicates a first resource for sidelink communication, the first resource comprises x subframes, x is a positive integer larger than 1;
send, in a subframe n, first data to a second communications device, wherein the subframe n belongs to the x subframes;
receive second indication information from the network device, wherein the second indication information is used to determine a second resource for transmitting feedback information, wherein the second resource comprises y subframes, y is a positive integer, and the y subframes belong to the x subframes; and
receive, in a subframe m, feedback information of the first data from the second communications device, wherein the subframe m belongs to the y subframes, the subframe m is a subframe that is after a subframe n+k and with a minimum sequence number in the y subframes, wherein the subframe n+k is a $k^{th}$ subframe after the subframe n, wherein k is predefined or is received by the first communications device from the network device, and wherein n, m, and k are all non-negative integers.

5. The first communications device according to claim 4, wherein:
the subframe m comprises a plurality of first time units, and wherein receiving, in the subframe m, the feedback information of the first data from the second communications device comprises:
receiving, on one of the plurality of first time units comprised in the subframe m, the feedback information of the first data from the second communications device.

6. The first communications device according to claim 4, wherein the first indication information comprises a first bit map, and wherein the second indication information comprises a second bit map.

7. The first communications device according to claim 4, wherein at least one first symbols in each of the y subframes is used to transmit data, at least one second symbols of the y subframe is used to transmit feedback information, the at least one first symbols and the at least one second symbols comprise different resources.

8. A feedback information sending method, comprising:
receiving, by a second communications device, first indication information from a network device, wherein the first indication information indicates a first resource for sidelink communication, the first resource comprises x subframes, x is a positive integer larger than 1;
receiving, by the second communications device in a subframe n, first data from a first communications device;
receiving, by the second communications device, second indication information from the network device, wherein the second indication information is used to determine a second resource for transmitting feedback information, wherein the second resource comprises y subframes, y is a positive integer, and the y subframes belong to the x subframes; and
sending, by the second communications device in a subframe m, feedback information of the first data to the first communications device, wherein the subframe m belongs to the y subframes, the subframe m is a subframe that is after a subframe n+k and with a minimum sequence number in the y subframes, wherein the subframe n+k is a $k^{th}$ subframe after the subframe n, wherein k is predefined or is received by the first communications device from the network device, and wherein n, m, and k are all non-negative integers.

9. The method according to claim 8, wherein:
the subframe m comprises a plurality of first time units, and wherein the sending, by the second communications device and in the subframe m, the feedback information of the first data to the first communications device comprises:
sending, by the second communications device and on one of the plurality of first time units comprised in the subframe m, the feedback information of the first data to the first communications device.

10. The method according to claim 8, wherein the first indication information comprises a first bit map, and wherein the second indication information comprises a second bit map.

11. The method according to claim 8, wherein at least one first symbols in each of the y subframes is used to transmit data, at least one second symbols of the x subframe is used to transmit feedback information, the at least one first symbols and the at least one second symbols comprise different resources.

12. A second communications device, comprising:
at least one processor; and
a memory storing instructions executable by the at least one processor, wherein the instructions, when executed by the at least one processor, instruct the at least one processor to:
receive first indication information from a network device, wherein the first indication information indicates a first resource for sidelink communication, the first resource comprises x subframes, x is a positive integer larger than 1;
receive, in a subframe n, first data from a first communications device;
receive second indication information from the network device, wherein the second indication information is used to determine a second resource for transmitting feedback information, wherein the second resource comprises y subframes, y is a positive integer, and the y subframes belong to the x subframes; and
send, in a subframe m, feedback information of the first data to the first communications device, wherein the subframe m belongs to the y subframes, the subframe m is a subframe that is after a subframe n+k and with a minimum sequence number in the y subframes of the second resource, wherein the subframe n+k is a $k^{th}$ subframe after the subframe n, wherein k is predefined or is received by the first communications device from the network device, and wherein n, m, and k are all non-negative integers.

13. The second communications device according to claim 12, wherein:

the subframe m comprises a plurality of first time units, and wherein sending, in the subframe m, the feedback information of the first data to the first communications device comprises:

sending, on one of the plurality of first time units comprised in the subframe m, the feedback information of the first data to the first communications device.

14. The second communications device according to claim 12, wherein the first indication information comprises a first bit map, and wherein the second indication information comprises a second bit map.

15. The method according to claim 1, wherein at least one first symbols in each of the y subframes is used to transmit data, at least one second symbols in each of the y subframes is used to transmit feedback information, the at least one first symbols and the at least one second symbols comprise different resources.

16. The second communications device according to claim 12, wherein at least one first symbols in each of the y subframes is used to transmit data, at least one second symbols of the x subframe is used to transmit feedback information, the at least one first symbols and the at least one second symbols comprise different resources.

* * * * *